Nov. 8, 1949  R. H. GERKE  2,487,233
METHOD OF MAKING BATTERY SEPARATORS
Filed Feb. 28, 1947  3 Sheets-Sheet 3
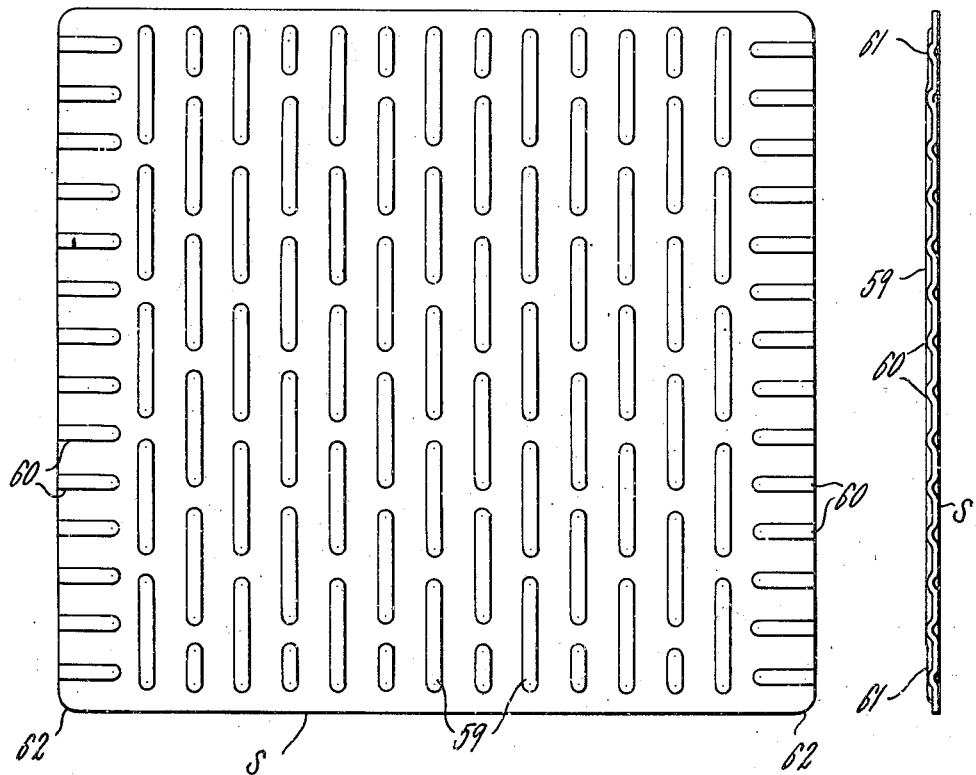
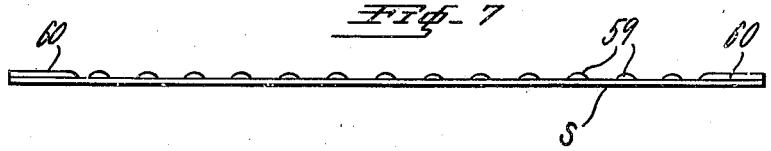
INVENTOR.
ROSCOE H. GERKE
BY
Charles C. Willson
ATTORNEY Patented Nov. 8, 1949

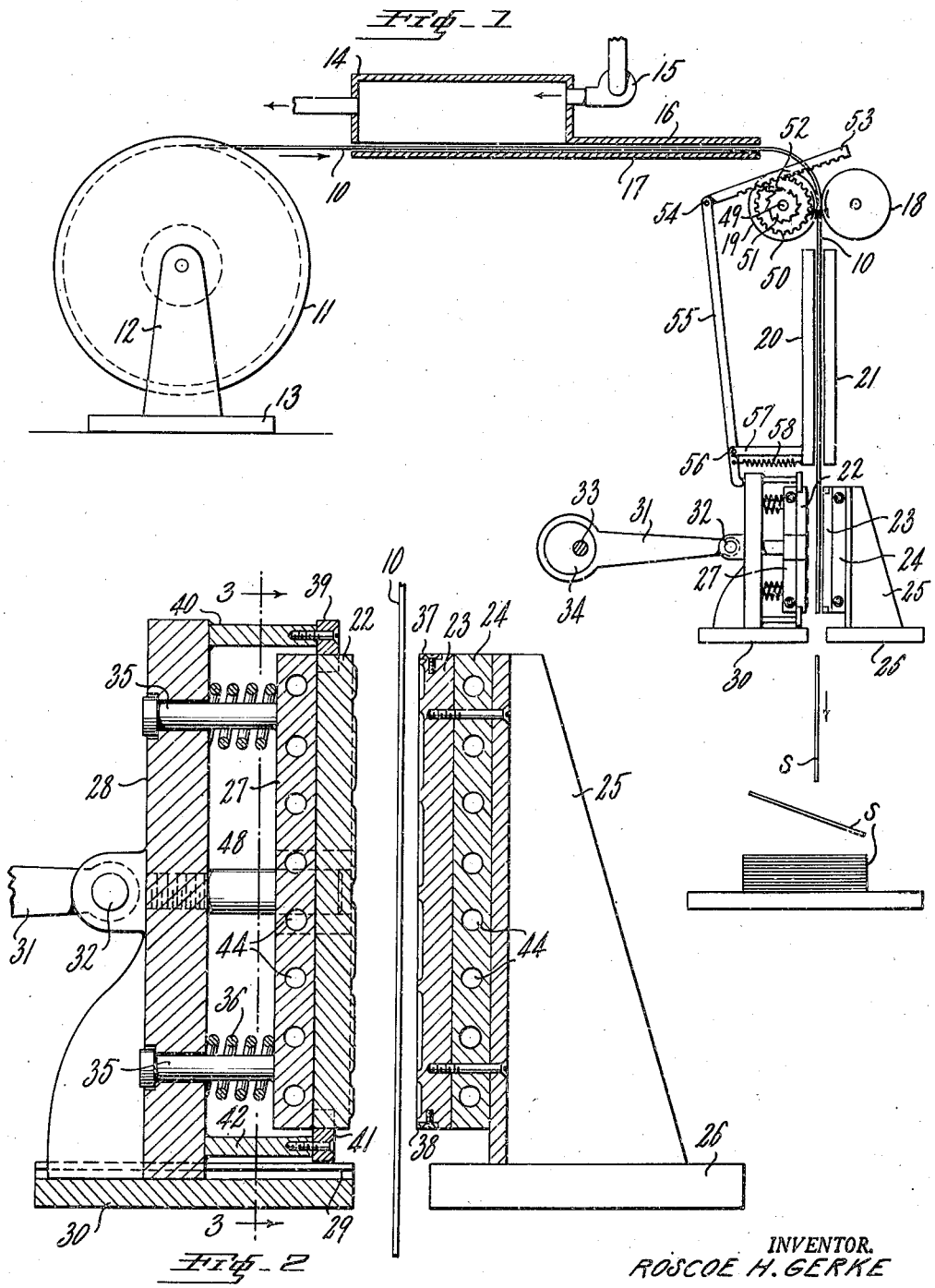

2,487,233

UNITED STATES PATENT OFFICE 2,487,233

METHOD OF MAKING BATTERY SEPARATORS

Roscoe H. Gerke, Barrington, R. I., assignor to United States Rubber Company, New York, N. Y., a corporation of New Jersey Application February 28, 1947, Serial No. 731,442

3 Claims. (Cl. 18—56)

This invention relates to a novel method of making battery separators of microporous hard rubber, and more particularly to the method of embossing such separators.

Battery separators are used between the alternating positive and negative plates of a battery to provide an insulating material therebetween while at the same time permitting free electrolytic conduction between the plates.

It has been proposed heretofore to make such battery separators of microporous sheets of hard or vulcanized rubber, and to emboss such sheets to provide them with raised hollow ribs. The present invention relates primarily to an improved method of embossing such microporous rubber sheets whereby this may be accomplished at high speed and at low cost. The quantity of battery separators in commercial use is tremendous, and therefore any improvement in the construction of battery separators or any improvement which will effect a reduction in the cost of producing such separators is important.

Microporous hard rubber when heated to a temperature of about 210° F., depending somewhat on the particular stock used, becomes pliant and highly flexible, and relatively thin sheets of such material become rag limp when heated much above this temperature. On the other hand if this material is cooled to a temperature below about 180° F. it becomes relatively stiff and brittle. It therefore possesses thermoplastic properties to the extent just indicated.

In order to emboss sheets of microporous hard rubber to produce ribbed battery separators it is necessary to heat such sheets until they become pliant and highly flexible so that they can be embossed without cracking or breaking, and while such sheets are subjected to the embossing pressure they should be cooled sufficiently to set the embossed design. If speed in production is to be secured the steps of embossing the separator sheet while it is hot and of cooling it while it is subjected to the embossing pressure must be performed rapidly.

The present invention contemplates a method whereby these embossing steps can be performed quickly and automatically with a minimum amount of attention on the part of the machine operator, and whereby the complete cycle of embossing a separator may be performed in less than three seconds.

In carrying out the method of the present invention the sheet of microporous vulcanized hard rubber having a thickness of about .030" is heated to a temperature of between about 210° F. to 450° F., and it is preferably freed from moisture to a point where it contains less than 1% moisture based on the dry weight of the sheet, so that the sheet may be quickly heated at atmospheric pressure, and so that the embossing dies will be free from moisture caused by steam from the heated sheet while it is being embossed. The sheet while in this soft highly flexible condition is placed between the male and female dies of a relatively cool embossing press. The press is then closed quickly so as to emboss the sheet while it is still hot, and then cool it sufficiently to set the sheet while under the embossing pressure. After the sheet has been cooled to a temperature somewhat below 180° F. it will retain approximately 85% of the design imparted thereto by the embossing operation, after the press is opened.

In order to speed up the step of cooling the embossed sheet while under the embossing pressure, an important feature of the present invention resides in the use of a cooling fluid such as a stream of air, or a stream of water or other liquid to maintain the embossing dies at a temperature preferably between 50° F. and 60° F., so that these relatively cold dies will start cooling the hot sheets of microporous rubber as soon as the embossing press is closed.

The method of the present invention may be employed to emboss successive microporous sheets after each sheet has been cut to the approximate size of the desired battery separator, but it is preferable to supply such material to the embossing press in the form of a long strip of the stock having the approximate width desired in the finished separator, and to advance such strip to the embossing press by a step by step movement. After the leading end portion of such strip has been embossed it may be cut from the strip, preferably while the mold is closed, and then discharged from the mold as a finished embossed battery separator ready for use in a battery. As soon as one battery separator is discharged from the mold the stock for another separator may be inserted.

The above and other features of the present invention will be further understood from the following description when read in connection with the accompanying drawings showing one good practical form of apparatus for carrying out the method of the present invention, and adapted to produce embossed battery separators from a continuous strip of flat material.

In the drawings:

Fig. 1 is a side elevation with parts in section of one form of mechanism which may be used to carry out the present method.

Fig. 2 on a larger scale is a vertical sectional view through the male and female dies of the embossing press shown in Fig. 1.

Fig. 5 is a plan view of a battery separator embossed upon the equipment shown in Figs. 1 to 4 inclusive and having one good practical rib arrangement.

Fig. 6 is a side edge view of the separator of Fig. 5; and

Fig. 7 is an edge view of the lower edge of the separator of Fig. 5.

Figure 3:
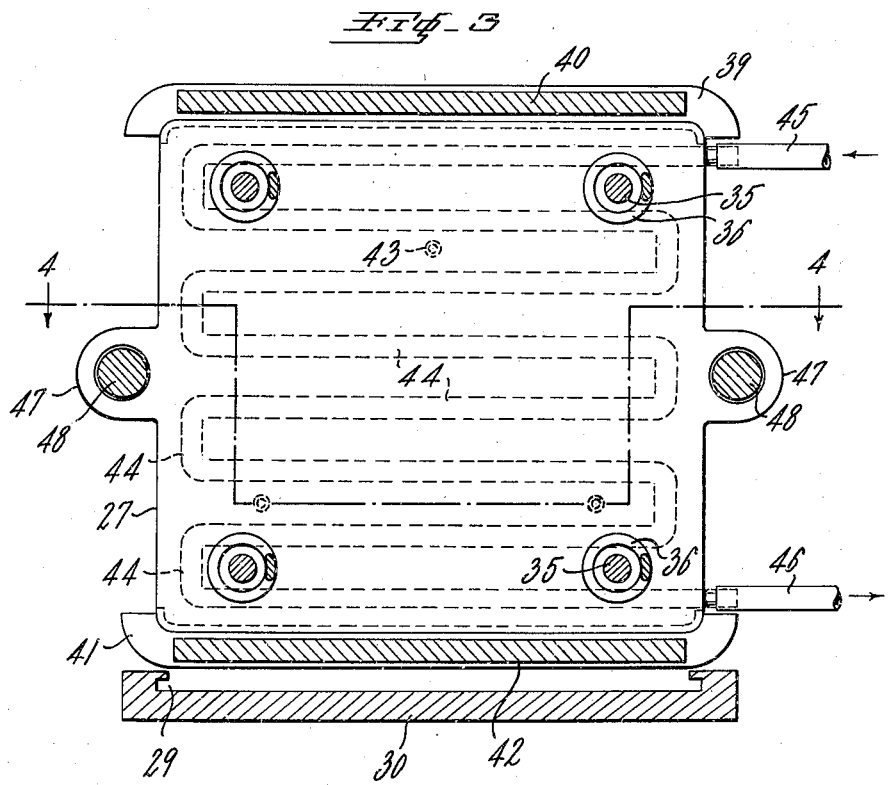
Fig. 3 is a sectional view taken on the line 3—3 of Fig. 2.

In Fig. 1 of the drawing the battery separator stock from which the embossed separators are to be produced, and comprising a sheet of microporous vulcanized hard rubber, is supplied to the embossing apparatus in the form of a long strip 10 wound upon the spool or reel 11 that is rotatably supported by the uprights 12 that extend upwardly from the base plate 13. This strip 10 preferably has the width desired in the finished separator so as to make trimming of the sides of the separator unnecessary.

It is found that the embossing operation contemplated by the present invention can be carried out more quickly and more satisfactorily if the material to be embossed is practically free from moisture so that it may be heated quickly at atmospheric pressure to the embossing temperature, and also to reduce the possibility of condensing moisture on the chilled embossing die surface. Therefore in the construction shown in Figs. 1 and 2 of the drawing the flat strip 10 as it is unwound from the supply package 11 is passed through the drying chamber 14 through which hot air may be passed in the direction indicated by the arrows by a blower 15. After the strip 10 has given up most of its moisture in the chamber 14 it passes between the heating plates 16 and 17 which raise the temperature of the strip and remove additional moisture. This strip then passes between the feed rolls 18 and 19 adapted to be operated intermittently, in a manner hereinafter described, to pull the strip forward step by step from the source of supply and feed it down through the final heating platens 20 and 21 to the embossing press. The plates 16, 17, 20 and 21 may be heated by any suitable means and the strip 10 when fed into the embossing press should be at a temperature between about 210° F. and 450° F. If below 210° F. it may tend to crack under the embossing pressure and if above 450° F. it may tend to burn. The temperature which should be imparted to the stock 10 can be easily determined by determining whether or not the sheet embosses satisfactorily.

The embossing press as shown comprises a male die 22 and a female die 23, the latter is shown as bolted to the hollow cooling plate 24, which in turn is bolted to the rigid upright 25 mounted upon a fixed base plate 26. The male die 22 is shown as bolted to the hollow cooling plate 27 and these two plates are yieldingly attached to the sliding head 28 which is mounted to slide back and forth in the slideway 29 provided by the fixed base plate 30. The embossing press is shown in Figs. 1 and 2 of the drawing as open and is designed to be opened and closed by power operating means such as the eccentric arm 31 which is pivotally secured to the sliding head 28 at 32.

A power driven shaft 33 having rigidly secured thereto the eccentric 34 is provided to actuate the eccentric arm 31 to thereby open and close the embossing press. The male die 22 is, as above stated, yieldingly mounted upon the head 28 to avoid excessive pressure being exerted upon the stock when the press is closed, and to this end the cooling plate 27 is secured to the head 28 by the sliding bolts 35 which pass through the coiled springs 36 that are confined between an inner face of the head 28 and a face of the plate 27.

Since in the construction shown in the drawings the stock to be embossed is supplied to the embossing press in the form of a continuous strip 10, it is necessary to shear this strip either before or after the leading portion thereof has been embossed to form a separator. The apparatus shown is adapted to perform this shearing operation at both the upper and lower end of the battery separator while the separator is held in the closed press. This serves to trim both ends of the separator accurately after it is embossed, and to provide the finished separator with four rounded corners as shown in Fig. 5 of the drawing, to thereby lessen the danger of such corners being broken.

The cutting apparatus which is best shown in Fig. 2 of the drawing comprises an upper knife 37 and lower knife 38 mounted in recesses formed in the die 23 and rigidly bolted thereto. These knives are rounded at each end to cut the round corners of the battery separator as shown in Fig. 5. The upper cutter 39 which cooperates with the upper knife 37 is bolted to a rigid projection 40 on the sliding head 28, and the lower cutter 41 which cooperates with the knife 38 is bolted to the rigid portion 42 upon the sliding head. The arrangement is such that when the eccentric 34 is turned by its shaft 33 in a direction to move the head 28 in the stock embossing direction it will close the press to exert a predetermined amount of pressure upon the separator being embossed, whereupon the springs 36 will yield to relieve the separator from excessive pressure. As the head 28 continues to advance in the die closing direction the cutters 39 and 41 will continue to move with this head relatively to the yieldingly supported die 22, to thereby sever the stock 10 at the upper and lower edge of the press while the stock is tightly gripped between the dies. Then as the eccentric continues to rotate the head 28 will be retracted to open the press and permit the embossed separator S to drop by gravity to form the stack shown in Fig. 1 of the drawing. The newly formed embossed separator may tend to stick to one of the dies, and in order to release the separator from the dies the spring operated push pins 43, see Figs. 3 and 4, may be mounted in both the male and female dies. The depth of the ribs and depressions on the dies should be slightly greater than actually desired in the finished separator since the separator will lose about 15% of the design when the mold is opened.

Figure 4:
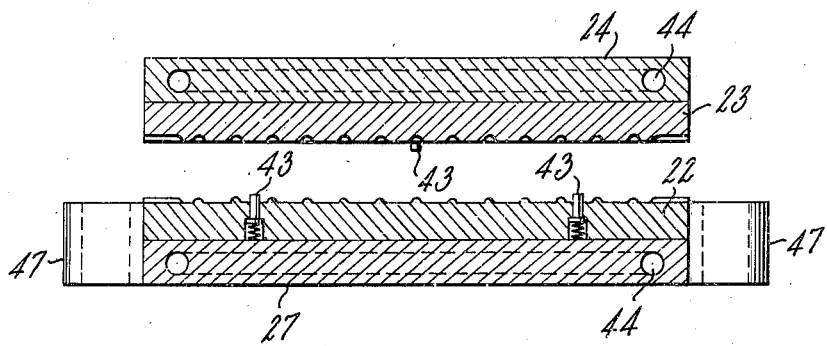
Fig. 4 is a sectional view taken on the line 4—4 of Fig. 3 and shows both dies in spaced relation to each other.

Since, as above stated, the hot freshly embossed separator should be cooled before the embossing press is open, it is important to provide means for preventing the temperature of the dies 22 and 23 from rising appreciably due to their engagement with successive portions of the hot separator stock 10. This desired cooling action is secured in the construction shown by clamping the die 23 to the cooling plate 24 and the die 22 to the cooling plate 27, as above described, and which plates have the fluid passages 44 extending back and forth therethrough, so that when a cooling fluid such as air or water is supplied to the passages 44 by an inlet pipe 45 it will circulate through the cooling plate and then out through a pipe 46, whereupon the cooling fluid may be again cooled and circulated through the cooling plates. The pipes 45 and 46 connected to the movable cooling plate 27 should be flexible to accommodate this movement, and the movable plate 27 as best shown in Fig. 3 of the drawing, is provided with the projecting ears 47 having holes therethrough to slidably receive the supporting guides 48 rigidly secured to the sliding head 28. It is desirable that the cooling mechanism keep the temperature of the dies between 50° F. and 60° F. If they are kept below 50° F. the condensation of moisture from the atmosphere on the dies may prove objectionable, and if allowed to rise much above 60° F. the separator will be slow in cooling.

When the stock to be embossed is supplied to the embossing press in the form of a continuous strip 10 as shown, it is necessary to feed this strip to the embossing press with a step by step movement in accurately timed relation with the opening and closing of the press, and this is accomplished in the construction shown by providing means for periodically turning the feed rolls 18 and 19. To this end in the construction shown the roll 19 which is keyed to the shaft 49 is driven by a gear 50 that is operatively connected to the shaft 49 by the ratchet wheel 51 and pawl 52 adapted to rotate the roll 19 only in one direction to feed the strip 10 to the press. The gear 50 is periodically rotated by the rack 53 one end of which is pivoted at 54 to the vertical lever 55 that is pivotally secured at 56 to a support 57. The lower end of the lever 55 lies in the path of the head 28 as the latter is moved to the press open position, and the lower end of this lever is urged to the right by the spring 58. The arrangement is such that as the head 28 moves to open the press the lever 55 will be rocked to turn the roll 19 and feed fresh stock 10 to the press.

To summarize the operation of the apparatus so far described, a sheet of microporous vulcanized rubber which is to be embossed is supplied in the form of a strip or ribbon 10. This strip is freed from most of its moisture and is heated to the desired temperature by the apparatus 14 to 21 inclusive. It is then fed into the press and the press is closed quickly so as to emboss the stock before it has been cooled appreciably by its contact with the cool metal dies. While the separator is being cooled by its contact with the dies 22, 23, a slightly further movement of the head 28 towards the die 23 causes the cutters 37, 38, 39 and 41 to shear the separator at both ends, and as soon as the separator is cooled sufficiently to set the same the die may be opened to discharge the finished embossed separator therefrom. It has been found in practice that this entire cycle of operation may be performed in less than three seconds, and one complete separator after another may be turned out by the apparatus shown with very little attention on the part of the machine attendant, so that one operator can attend a number of such machines.

Battery separators made of microporous hard rubber are relatively fragile and should be carefully designed as to the disposition of the ribs so as to decrease as far as possible their tendency to break or crack, and also to facilitate the stuffing of the separators in place between the positive and negative battery plates. In assembling a storage battery the separators are loosely placed between the plates, and to facilitate this the height of the ribs is reduced near the upper and lower ends of the separator as will be hereinafter pointed out. After the separators have been introduced between the plates the side edges are tapped to line them up, but this causes frequent breakage.

It is found that breakage of the separators from various causes may be reduced to a considerable degree by constructing the separator S as shown in Figs. 5, 6, and 7 of the drawing so as to provide the body portion of such separator with vertically disposed, non-continuous ribs 59 which are spaced from each other to provide flat unembossed areas therebetween. These ribs preferably terminate a short distance from the upper and lower edges of the separator as shown to reduce the tendency of these edges to crack. It has been found that the tendency of the side edges to crack is very materially reduced by providing each side edge with the relatively short horizontal or nearly horizontal ribs 60. The stuffing of the separators in between the plates above mentioned is facilitated by flattening slightly all ribs located near the upper and lower end of each separator as indicated by 61 in Fig. 6. Both ends of a separator are formed with these slightly flattened ribs so that either end may be used as the lower end. The battery separators constructed in accordance with the present invention may be given various other rib arrangements than that shown in the drawing, and the ribs may or may not extend to all four edges as desired; it is found, however, that the top and bottom edges are easier to cut as above-described if the ribs do not extend to such edges, and it is also found that the tendency of the corners of the separator to break is reduced by rounding these corners as indicated by 62.

The embossing of the separators in a dry state in which they contain less than 1% moisture, as herein contemplated, not only permits the use of embossing temperatures above the boiling point of water, but produces finished separators which may be stored in this dry condition for future use in dry charge storage batteries, where it is desired to have a minimum of moisture present in the battery cell assembly. It also enables the separators to be cooled quickly by their contact with the clean metal surfaces of the relatively cool embossing dies and thereby enable the complete embossing cycle to be performed quickly.

Having thus described my invention, what I claim and desire to protect by Letters Patent is:

1. The method of producing an embossed battery separator having ribs protruding from a face of the separator sheet and formed by displacing the entire thickness of the rib-forming stock; which includes the steps of forming a microporous sheet of vulcanized hard rubber, heating this vulcanized sheet in a dry condition until it becomes free of moisture, pliant and highly flexible, while in this condition placing it in a much cooler embossing press and closing the press quickly to emboss the sheet with sharply defined up-standing ribs while it is hot and highly flexible, and holding the press closed upon the sheet for less than three seconds to set the sheet in its embossed condition by the cooling action of the press upon the embossed sheet, and then opening the press to remove the embossed sheet.

2. The method of embossing successive battery separators having pronounced protruding ribs at a faster rate than one every three seconds; which includes the steps of forming a microporous sheet of vulcanized hard rubber, heating this vulcanized sheet in a dry condition until it becomes free of moisture, pliant and highly flexible, while in this condition placing it in a much cooler embossing press and closing the press quickly to emboss the sheet through from one face to the other to form sharply defined up-standing ribs while the sheet is hot and highly flexible, and holding the press closed upon the sheet until it is set in its embossed condition in a fraction of said three seconds by the cooling action of the press, and then opening the press to remove the embossed sheet.

3. The method of producing an embossed battery separator having ribs protruding from a face of the separator sheet and formed by displacing the entire thickness of the rib-forming stock; which includes the steps of forming a microporous sheet of vulcanized hard rubber, heating this vulcanized sheet in a dry condition until it becomes free of moisture, pliant and highly flexible, while in this condition placing it in a much cooler embossing press and closing the press quickly to emboss the sheet with sharply defined up-standing ribs while it is hot and highly flexible, and holding the press closed upon the sheet to set the sheet in its embossed condition in less than three seconds by the cooling action of the press upon the embossed sheet so that the sheet will retain at least 85% of the design imparted by the press upon removal of the sheet from the press.

ROSCOE H. GERKE.

REFERENCES CITED

The following references are of record in the file of this patent:

UNITED STATES PATENTS

| Number | Name | Date |
|---|---|---|
| 1,904,268 | Bronson | Apr. 18, 1933 |
| 2,030,066 | Jenett | Feb. 11, 1936 |
| 2,108,023 | Salemme | Feb. 8, 1938 |
| 2,142,445 | Helwig | Jan. 3, 1939 |
| 2,318,111 | Steinberger | May 4, 1943 |
| 2,414,177 | Smith | Jan. 16, 1947 |
| 2,422,148 | Uhlig | June 10, 1947 |